United States Patent
Candy

(10) Patent No.: US 10,969,511 B2
(45) Date of Patent: Apr. 6, 2021

(54) SIGNAL PROCESSING TECHNIQUE FOR A METAL DETECTOR

(71) Applicant: Minelab Electronics Pty Limited, Mawson Lakes (AU)

(72) Inventor: Bruce Halcro Candy, Mawson Lakes (AU)

(73) Assignee: Minelab Electronics Pty. Limited, South Australia (AU)

( * ) Notice: Subject to any disclaimer, the term of this patent is extended or adjusted under 35 U.S.C. 154(b) by 341 days.

(21) Appl. No.: 15/848,815

(22) Filed: Dec. 20, 2017

(65) Prior Publication Data

US 2018/0172869 A1 Jun. 21, 2018

(30) Foreign Application Priority Data

Dec. 20, 2016 (AU) .............................. 2016905282

(51) Int. Cl.
| | |
|---|---|
| *G01V 3/10* | (2006.01) |
| *G01V 3/02* | (2006.01) |
| *G01V 3/15* | (2006.01) |
| *G01V 3/38* | (2006.01) |

(52) U.S. Cl.
CPC .................. *G01V 3/10* (2013.01); *G01V 3/02* (2013.01); *G01V 3/104* (2013.01); *G01V 3/15* (2013.01); *G01V 3/38* (2013.01)

(58) Field of Classification Search
CPC .................................... G01V 3/10; G01V 3/02
USPC .......................................................... 702/65
See application file for complete search history.

(56) References Cited

U.S. PATENT DOCUMENTS

| | | | |
|---|---|---|---|
| 2007/0296415 A1* | 12/2007 | Stamatescu | G01V 3/104 324/326 |
| 2008/0074114 A1* | 3/2008 | Candy | G01V 3/104 324/326 |
| 2011/0210740 A1 | 9/2011 | Candy | |
| 2012/0146647 A1 | 6/2012 | Candy | |
| 2013/0229174 A1* | 9/2013 | Knaak | G01V 3/10 324/207.12 |
| 2014/0232408 A1 | 8/2014 | Candy | |
| 2015/0035543 A1* | 2/2015 | Candy | G01R 27/2611 324/602 |
| 2015/0168584 A1* | 6/2015 | Candy | G01V 3/101 324/329 |

* cited by examiner

*Primary Examiner* — Eman A Alkafawi
(74) *Attorney, Agent, or Firm* — The Webb Law Firm

(57) ABSTRACT

A metal detector, includes a transmitter for transmitting a repeating sequence of transmit magnetic field, each of the sequence includes a period of changing or constant non-zero transmit magnetic field, immediately followed by period of rapid change of transmit magnetic field, immediately followed by a period of substantially constant or zero transmit magnetic field; a receive coil; and a damping resistor. An end of the receive coil is connected to one end of the damping resistor and the other end of the damping resistor is connectable to a circuit with a variable parameter. A signal is induced in the receive coil during the period of rapid change of transmit magnetic field, and the signal induced in the receive coil decays at least at a termination of the period of rapid change of transmit magnetic field.

21 Claims, 10 Drawing Sheets

SIGNAL PROCESSING TECHNIQUE FOR A METAL DETECTOR

CROSS-REFERENCE TO RELATED APPLICATION

This application claims priority to Australian Provisional Patent Application No. 2016905282 filed Dec. 20, 2016, the disclosure of which is hereby incorporated in its entirety by reference.

TECHNICAL FIELD

The present invention relates to metal detection.

BACKGROUND

A problem occurs in metal detection when searching a target using a time-domain metal detector in an area including magnetic soils. Unwanted spurious processed signals arise when receive demodulation occurs shortly after rapid changes in transmit magnetic fields transmitted by the metal detector, during a time when there is near constant or zero transmit magnetic field by a transmitter of the metal detector, for example, when a receive demodulation occurs very shortly after a transmit back-emf period of a pulse induction type metal detector. As pulse induction metal detection technology is known and relatively simple, henceforth in the text that follows, a pulse induction metal detector will be used to assist in describing signal processing techniques for the purposes of simpler communication for those skilled in the art. However, the signal processing techniques may be equally applied to other technologies, for example those with very rapid reactive voltages transitions (high second derivatives of the transmit magnetic field).

It is known that the sooner a receive demodulation commences after a back-emf period, the capability for detecting short time-constant target of a detector can be improved. Examples of short time-constant targets are landmines with minimal metal components and small gold nuggets. The spurious signals arise when detecting in magnetic soils during the receive period of a pulse induction detector following shortly after its transmit back-emf. This is because, for a detector with separate receive coil from the transmit coil, the receive coil of the detector still has decaying signals induced in it due to the transmit coil back-emf transients, and these induced signals are modulated by spatially variable soil permeability, which is modulating the receive-transmit coil coupling as the coil passes over soils of differing permeability.

While this specification mainly addresses metal detectors with magnetic antennas having separate receive coil(s) from the transmit coil(s), it would be apparent from some embodiments described herein that the techniques can be applied to mono-loop detectors.

For a detector with separate transmit and receive coils, such coils are usually arranged so that the receive coil is in approximate "null" with respect to the transmit coil; in effect a (magnetic) transformer but with very near zero coupling between the primary and secondary. This null or near zero transformer coupling is altered by the presence of soils or targets, and in effect it is this change that is detected when demodulation occurs usually during a receive period post the cessation of the back-emf period in Pulse Induction (PI) or PI-like detectors. The transmit period excites viscous superparamagnetic soil particles to (temporarily) partially align with it. During the receive (post transmit) period, this viscous remanence decays due to thermal effects. Further, the transmit signal also induces eddy currents in soil conductive components such as conductive saline components. However, it is prior art, that both these soils source signals (remnant viscous superparamagnetism decay and saline eddy current decay) may be cancelled from a received processed output due to a selection of demodulation processing. However, an exception is the said coupling of the transmit coil signal induced into the receive coil from varying coupling of lossless reactive soil magnetic permeability. One technique for reducing this is given in US20150035543 that discloses the advantages of implementing a negative capacitance generator that partially increases the natural resonance of the receive coil taking distributed capacitance and inductance into account. This invention is independent of whether such a negative capacitance generator is used or not. Traditionally, designers have no option but to design the earliest commencement of the receive demodulation following the back-emf as compromise between detecting fast time constant targets and tolerable spurious soil induced signals from variable lossless reactive magnetic permeability modulated signals inducing variable decaying transients from the back-emf signal in the receive coil.

Other methods of reducing the time of these receive coil transients are given in US20120146647 and US20150168584 wherein the back-emf in the transmit coil is rapidly terminated rather than be critically damped, but this invention offers an alternative regardless whether the methods of US20120146647 and US20150168584 are employed or not.

SUMMARY

According to a first aspect of the present invention, there is provided a metal detector, including: a transmitter for transmitting a repeating sequence of transmit magnetic field, each of the sequence includes a period of changing or constant non-zero transmit magnetic field, immediately followed by period of rapid change of transmit magnetic field, immediately followed by a period of substantially constant or zero transmit magnetic field; a receive coil; and a damping resistor; wherein an end of the receive coil is connected to one end of the damping resistor; and the other end of the damping resistor is connectable to a circuit with a variable parameter; wherein a signal is induced in the receive coil during the period of rapid change of transmit magnetic field, and the signal induced in the receive coil decays at least at a termination of the period of rapid change of transmit magnetic field; and wherein the variable parameter is controlled, at a selected time, to change from a parameter value to a different parameter value when the signal induced in the receive coil is decaying, or during the period of rapid change of transmit magnetic field, such that the rate of change of the decay is more rapid than when such control of the variable parameter is absent.

In one form, the change of the variable parameter is effected by a switch, wherein the switch is controlled to switch the other end of the damping resistor from a circuitry element to another when the signal induced in the receive coil is decaying, or during the period of rapid change of transmit magnetic field, such that the rate of change of the decay is more rapid than when such control of the switch is absent.

In one form, the change of the variable parameter is effected by a DAC, wherein the DAC is controlled to change an output of the DAC from one value to another when the signal induced in the receive coil is decaying, or during the period of rapid change of transmit magnetic field, such that the rate of change of the decay is more rapid than when such control of the DAC is absent. In one form, the control of the DAC is based on a signal from the receive coil.

In one form, the metal detector further includes a voltage source, wherein the voltage source is connected to an end of the damping resistor opposite to the end connected to an end of the receive coil, wherein the voltage source is controlled to reduce or eliminate an induced energy across the receive coil during the period of substantially constant or zero transmit magnetic field, the induced energy caused by a detection of the transmit magnetic field by the receive coil during the period of rapid change of transmit magnetic field; the control of the voltage source includes: changing a voltage value of the voltage source from a first voltage to a fixed voltage at a first time or during a first time period within the period of rapid change of transmit magnetic field, the first voltage is dependent on the induced energy during at least a duration of the period of rapid change of transmit magnetic field; and the first voltage and fixed voltage and first time or first time period are selected to increase the rate of change of the decay.

In one form, an effective parallel inductance of the receive coil inductance of value L, and an effective net parallel capacitance of the receive coil of value C, forms a parallel network consisting of L, C and a parallel damping resistor of value R resistance, such that the parallel network is a substantially critically damped network, and the values of the first voltage and fixed voltage, and values of the first time or first time period are selected such that at least part of a receive signal in the receive coil in a form $$\frac{t}{\sqrt{LC}} e^{-t/\sqrt{LC}}$$

is substantially cancelled, following a commencement of the period of substantially constant or zero transmit magnetic field or first time or first time period, whichever occurs later within the repeating sequence.

In one form, the first voltage and the first time or first time period are selected so that an initial voltage across the receive coil divided by an initial current flowing through the effective parallel inductance of the receive coil is approximately −2R at the termination of the changing transmit magnetic field when the period of substantially constant or zero transmit magnetic field commences.

In one form, the voltage source changes from the first voltage to a second voltage at the first time or during the first time period relative to the commencement of the period of substantially constant or zero transmit magnetic field; and wherein the voltage source changes from the second voltage to the fixed voltage at a second time or during a second time period relative to the commencement of the period of substantially constant or zero transmit magnetic field, the second time or second time period being after the first time or first time period, and wherein the second time or at least part of the second time period occurs during at least part of the period of substantially constant or zero transmit magnetic field, such that at least part of either or both the first voltage and the second voltage are controlled by a signal induced in the receive coil during at least part of the period of rapid change of transmit magnetic field.

In one form, only one of the first voltage and the second voltage are controlled by a signal induced in the receive coil during at least part of the period of rapid change of transmit magnetic field, and whichever of the first voltage or the second voltage not controlled by the signal induced in the receive coil during at least part of the period of rapid change of transmit magnetic field is controlled by a signal induced in the receive coil during at least part of the period of substantially constant or zero transmit magnetic field.

In one form, the induced energy in the receive coil immediately following the second time or second time period that results from a detection of the transmitted magnetic field induced in the receive coil during the period of rapid change of transmit magnetic field is substantially zero.

In one form, the second voltage is controlled by a first negative loop with an input signal from the receive coil during at least part of the period of substantially constant or zero transmit magnetic field.

In one form, at a first time or during a first time period, an impedance lower than the damping resistor is applied across the receive coil and continues to be applied until a third time during the period of substantially constant or zero transmit magnetic field.

In one form, at a first time or during a first time period, an impedance higher than the damping resistor is applied across the receive coil and continues to be applied until a third time during the period of substantially constant or zero transmit magnetic field.

In one form, the first voltage is controlled by a second negative loop with an input signal from the receive coil during at least part of the period of substantially constant or zero transmit magnetic field.

In one form, part of the voltage source includes a switch for switching at least part of the damping resistor to the first voltage, second voltage or the fixed voltage. In one form, part of the voltage source includes a capacitor.

In one form, the damping resistor includes two resistors, a first resistor and a second resistor, such that a net value of the first resistor and second resistor connected in parallel has a value equal to that required for substantially critical damping of the receive coil or altered resistance away from critical damping during the first period until the third time.

In one form, the first resistor is connected to the voltage source and the second resistor is connected either to a fixed voltage or ground, or an open circuit, or a second voltage source that may also be controlled by a signal induced in the receive coil during at least part of the of rapid change of transmit magnetic field.

In one form, the receive coil is effectively shorted for a fourth period during the period of substantially constant or zero transmit magnetic field, or, immediately before the period of the period of rapid change in magnetic field transmitted by a transmit coil. In one form, the receive coil is effectively open circuit for a fifth period.

According to a second aspect of the present invention, there is provided a method for increasing a rate of decay of an induced signal in a receive coil of a metal detector due to a signal induced in a transmit coil of the metal detector, wherein the signal is induced in the transmit coil during a period of rapid change of transmit magnetic field when a period of changing transmit magnetic field transitions to a period of substantially constant or zero transmit magnetic field, and wherein the induced signal in the receive coil decays at least at the termination of the period of rapid change of transmit magnetic field, the method including: connecting one end of the receive coil to one end of a damping resistor, with the other end of the damping resistor connectable to a circuit with a variable parameter; and controlling the variable parameter, at a selected time, to change from one to another different one when the signal induced in the receive coil is decaying, or during the period of rapid change of transmit magnetic field, such that the rate of change of the decay is more rapid than when such control of the variable parameter is absent.

According to a third aspect of the present invention, there is provided a non-transitory computer readable medium including instructions, when executed, to perform the method of the second aspect.

BRIEF DESCRIPTION OF DRAWINGS

Embodiments of the present invention will be discussed with reference to the accompanying drawings wherein.

DESCRIPTION OF EMBODIMENTS

Figure 1:
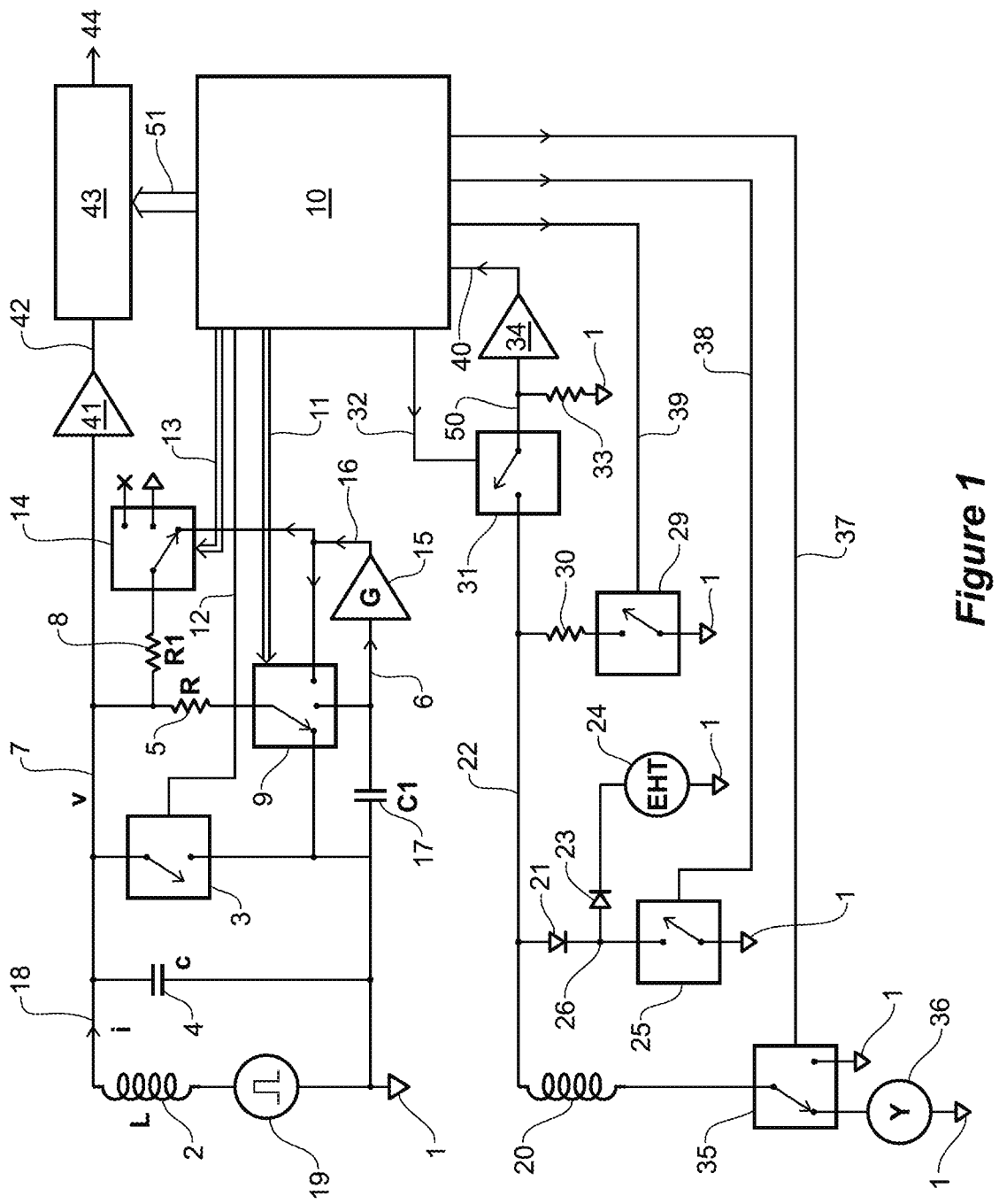
FIG. 1 shows an exemplary generalized block diagram for performing one embodiment of the invention.

In the context of this specification, unless stated otherwise, nulled coils refer to at least one transmitter and one receiver where in the absence of any external elements, the receiver would receive effectively no signal even when the transmitter is transmitting. This can be achieved, using Double D coil as an example, by carefully positioning the two coils such that EM fields passing through the overlapping coil portions of the receiver equals but in an opposite direction EM fields passing the non-overlapping coil portions of the receiver.

In the context of this specification, unless stated otherwise, back electromotive force (or back-emf) in a PI metal detector, is a period of rapidly changing transmit magnetic field when an EHT (extra high tension; e.g. 200V) voltage is induced across the transmit coil. This is manifest as a variable induced signal in the receive coil when the coil passes over variable magnetically permeable material such as magnetic soils. However, this invention applies equally to other PI-like metal detector technologies, such as those described in patents US20140232408 and US20110210740. These PI-like technologies also employ a period of rapidly changing transmit magnetic field when an EHT (extra high tension) voltage is applied across the transmit coil, and these periods are immediately followed by a period of constant transmitted magnetic field when receive signal demodulation occurs. Thus, the period of rapidly changing transmit magnetic field henceforth will be referred to as such.

In the context of this specification, unless stated otherwise, critically damped, critical damping refers to how an induced emf in the receive coil decays in response to a period of rapidly changing transmit magnetic field. When a critical damping is applied, the induced receive signal reduces to zero in a reduced time when compared to under-damping or over-damping, all other conditions being equal.

Unless stated otherwise, calculation in this specification assumes that the advantages of effective instantaneous termination of a period of rapidly changing transmit magnetic field is applied, but it could be modified to include, for example, a slower transmit coil critically damped back-emf decay.

In practice, the effects from a period of rapidly changing transmit magnetic field induce in a nulled coil a signal up to about a volt or two when the coil passes over the more extremely magnetically permeable soils, but of course, this depends on the coil characteristics, the transmit voltages, the soil permeability and proximity of the coil to the soil. Most of magnetic soil signals are from non-dissipative magnetic materials, and usually referred to as the "in-phase" component or "p" or a reactive component. For this component, the receive signal voltage mimics the shape of the transmit coil reactive emf, but is convolved with the transfer function of the network consisting of an effective parallel winding inductance and effective parallel capacitance and damping resistance of the receive coil. It is this "LCR" receive coil network in which the induced transients from a period of rapidly changing transmit magnetic field take time to decay which are pertinent to this invention. Any series winding resistances cause only a small error to this model. It is well known that for critical damping $$R = 0.5\sqrt{\frac{L}{C}}.$$

The self-resonance without the critical damping is $$\omega = \frac{1}{\sqrt{LC}}.$$

Further, unless stated otherwise, in all the mathematical calculation that follows, we assume that the transmit coil has a constant reactive EHT voltage applied across it during a period of rapidly changing transmit magnetic field and this voltage is forced to terminate effectively "instantly," and that this period duration of rapidly changing transmit magnetic field period is $\gg 1/\omega$. Also for the sake of simplicity of understanding, we assume that the soil has considerably more non-dissipative reactive permeability than the soil resistive viscous remnant magnetism (VRM) or saline components, and that signals from EMI, and induced relatively "DC-like" low frequencies voltages from the coil movement relative to environmental static magnetic fields, or, input electronics DC offsets or 1/f noise, are all effectively absent. In reality, these ignored signals do typically detract from the advantages of this invention, but in the soils where the advantages of this invention play a significant role, that is, in the more magnetically permeable soils, the receive signal induced from the soil during a period of rapidly changing transmit magnetic field usually dominates other spurious signals. For each embodiment, assume that each and every period of rapidly changing transmit magnetic field is closely approximately the same, and the illustrated waveforms and associated mathematics applies and repeats for each and every such period.

For each period of rapidly changing transmit magnetic field with a transmit coil having an "instantly" abrupt EHT termination, the receive induced emf is modelled in series with a receive coil effective parallel inductance L and is a voltage step from "X" volts to 0V when time "t=0," and called "X" in the following mathematics, wherein X can be due to variable coupling with the soil, the principal concern of this invention, or, direct transmit coil to receive coil coupling.

Let the received instantaneous voltage across the modelled receive coil capacitance C be "v" and the current flowing through the modelled inductance L be "i". If the induced voltage during the period of rapidly changing transmit magnetic field is modelled as a voltage "X" is series with a modelled inductance L, with X terminating as a step to 0V at t=0, then a signal induced in the receive coil decays at the termination of the period of rapid change of transmit magnetic field as $sv=(1+\omega t)e^{-\omega t}$ ignoring all other signal components other than X. The $\omega t e^{-\omega t}$ is the main cause of the persisting decaying transients following the period of rapidly changing transmit magnetic field. Thus eliminating this term will substantially reduce the problem. Thereafter reducing the $e^{-\omega t}$ term provides yet better results.

In one embodiment, a metal detector includes a transmitter for transmitting a repeating sequence of transmit magnetic field, each of the sequence includes a period of changing or constant non-zero transmit magnetic field, immediately followed by period of rapid change of transmit magnetic field, immediately followed by a period of substantially constant or zero transmit magnetic field.

An embodiment of this invention switches a damping resistor momentarily to differing circuitry during the back-emf which causes the back-emf induced signal in a receive coil to commence more rapid decay compared to the conventional critically damped "LCR" decay following the period of rapidly changing transmit magnetic field.

In another embodiment, a ratio of a signal (X) measured in the receive coil during the period of rapidly changing transmit magnetic field is fed-forward, that is, measuring a receive signal during the period of rapidly changing transmit magnetic field, of a "first voltage value," and a applying a proportion of this in series with the damping resistor. The first voltage value must at least be applied during some of period of rapidly changing transmit magnetic field, or, when the signal induced in the receive coil decays following the termination of the period of rapid change of transmit magnetic field.

In another embodiment, the metal detector further includes a voltage source, wherein the voltage source is connected to an end of the damping resistor opposite to the end connected to an end of the receive coil, wherein the voltage source is controlled to reduce or eliminate an induced energy across the receive coil during the period of substantially constant or zero transmit magnetic field, the induced energy caused by a detection of the transmit magnetic field by the receive coil during the period of changing magnetic field; the control of the voltage source includes: changing a voltage value of the voltage source from a first voltage to a fixed voltage at a first time or during a first time period within the period of changing magnetic field, the first voltage is dependent on the induced energy during at least a duration of the at least one period of changing transmit magnetic field; and the first voltage and fixed voltage and first time or first time period are selected to increase the rate of change of the decay.

This invention in effect increases the rate of decay of the signal induced in the receive coil at the termination of the period of rapid change of transmit magnetic field. To achieve this, one can rely on knowledge of when the period of rapidly changing transmit magnetic field terminates, or, by using an input sampling negative feedback loop of the receive signal from the receive coil.

FIG. 1 shows an exemplary generalized block diagram for performing one embodiment of the invention. In this FIG. 1, the circuit has a system ground 1. The whole receive coil is modelled as a parallel "ideal" inductor 2 of value L (Henrys), in parallel with a capacitance 4 of value C (Farads) consisting of the self-capacitance of the windings of the receive coil "ideal" inductor 2, the capacitance of cable(s) connecting the receive coil to the electronics, an input capacitance of preamplifier 41 and a parallel switch 3. The current i (Amps) flowing through inductor 2 is shown in the sense indicated by the arrow at 18. The voltage across capacitance 4 relative to the system ground 1 at node 7 is of value "v". The received induced voltage signal during a PI-like transmit period of rapidly changing transmit magnetic field is modeled as voltage source "X" 19 in series with inductor 2. A switch 3 may approximately short-circuit the capacitance 4 (node 7) to the system ground 1. This action is controlled by a metal detector timing generator 10 via line 12. Node 7 is connected to a resistor 5 of value R (Ohms) which is connected to switch 9. Switch 9 may be controlled to switch resistor 5 to the system ground 1, or, to capacitor 17 of value "C1" (Farads), or, to an output 16 of a buffer amplifier 15 of gain G. One end of capacitance 17 is connected to the system ground 1, and the other to node 6 which is connected to the switch 9 and an input to the buffer amplifier 15. Resistor 5 acts as a damping resistor. In conjunction with resistor 8 of value R1 (Ohms), the damping may be altered depending on whether resistor 8 is switched to the system ground 1 via switch 14 or not. Switch 14 is controlled by the metal detector timing generator 10 via lines 13, while switch 9 is controlled via lines 11. Switch 14 also may also switch resistor 8 to open circuit, or to the output of buffer amplifier 15.

Transmit coil 20 is connected to node 22, which in turn is connected to a switch 25 via diode 21 at node 26, and switch 25 may switch node 26 to the system ground 1 by a control line 38 generated in the metal detector timing generator 10. A transmit back-emf voltage (period of rapidly changing transmit magnetic field) at node 26 is clamped via diode 23 to an EHT (Extra High Tension) voltage of source 24, which is connected to the system ground 1. Another end of transmit coil 20 is connected to a switch 35, which may be switched to the system ground 1, or, to a voltage source 36 of voltage "Y" which is also connected to the system ground 1. Switch 35 is controlled by a signal at line 37 generated in the metal detector timing generator 10. Resistor 30 is connected between node 22 and the system ground 1 via switch 29. Switch 29 is controlled by a signal at line 39 generated in the metal detector timing generator 10. A T/R switch 31 controlled by a signal at line 32 generated in the metal detector timing generator 10, connects node 22 to an input of an amplifier 34 at node 50, which is also connected to the system ground 1 via resistor 33. An output 40 of amplifier 34 is fed to an input of the metal detector timing generator 10. The action of the transmit electronics consisting of transmit coil 20, switches 25 and 35 and T/R switch 31, the metal detector timing generator 10, diodes 21 and 23, voltage sources 36 and 24, resistors 30 and 33, and amplifier 34 act to clamp the back-emf and also to control a rapid termination of the transmitted magnetic field at the termination of a PI-like period of rapidly changing transmit magnetic field. Examples describing this circuit action can be found, for example, in US20120146647 and US20150168584.

An output 42 of the preamplifier 41 is connected to further receive processing in block 43 such as receive demodulation and filtering, ground balancing, and/or discrimination action. Block 43 feeds a system indicator output 44. Block 43 may receive control signals 51 from the metal detector timing generator 10.

In most embodiments described herein, not all elements in FIG. 1 are required, but they are shown in FIG. 1 for efficiency of comprehension.

For ease of discussion, the following values are assumed for all embodiments unless otherwise stated: X=1 (variable), L=0.3 mH (can be modulated in value by the soil permeability, but fixed otherwise), resonant frequency=500 kHz, C=337.74 pF (which also may be modulated by the soil as the inductance is modulated), $$R \text{ for critical damping} = 0.5\sqrt{\frac{L}{C}} = 471.24 \text{ Ohms}$$

(for example, the E12 standard 470 Ohms), $$\omega = \frac{1}{\sqrt{LC}} = 3.1416 \text{ Mrads/sec.}$$

Assume that no negative capacitance generator is applied to the receive coil as described in US20150035543 which if applied would act to reduce yet further the rate of decay of the X component induced in the receive coil post the period of rapidly changing transmit magnetic field. A reasonable value for C1 is high enough to low-pass filter the receive coil induced X from the period of rapidly changing transmit magnetic field (several microseconds), but having a fast enough time constant set by R times C1 to track X without noticeable phase lag (time constant of the order of say a 0.1 ms). Assume the duration of the period of rapidly changing transmit magnetic field $\gg 1/\omega$. Thus for example, if R is of the order of 500 Ohms, and C1 roundabout say 22 nF, then R times C1=11 µs. Because C1$\gg$C, the LCR network consisting of resistor 5, inductor 2, and capacitors 4 and 17, behaves as though the damping is approximately unchanged when resistor 5 is switched to a "voltage source" formed by the stored voltage across capacitor 17 of voltage X during (at least some of) the period of rapidly changing transmit magnetic field when switch 9 switches resistor 5 to capacitor 17, compared to if the "voltage source" were instead an "ideal zero output impedance" source.

In a first embodiment, neither buffer amplifier 15, nor switch 14 plus resistor 8 are employed. Assuming that the input impedance of preamplifier 41 is effectively "infinite", switch 3 is open, X is changing, and switch 9 selects node 6 only during the period of rapidly changing transmit magnetic field, or at least is switched to node 6 until the termination of the period of rapidly changing transmit magnetic field for a sampling period $\gg 1/\omega$ within the period of rapidly changing transmit magnetic field, but alternatively switched to the system ground 1 at all other times, then i is approximately zero during most of the period of rapidly changing transmit magnetic field, and hence approximately zero at the termination of the period of rapidly changing transmit magnetic field. Hence the voltage at node 6 is equal to X. This is because capacitor 17 is charged up to approximately X (via the action of switch 9) and thus approximately no voltage resides across the resistor during the capacitor 17 "sampling period" which for this embodiment is the period of rapidly changing transmit magnetic field when the induced receive voltage signal 19=X, and therefore i during this sampling period is approximately zero, or at least is at the termination of the period of rapidly changing transmit magnetic field. If however at the termination of the period of rapidly changing transmit magnetic field when X abruptly transitions to 0V, switch 3 is briefly switched on to short circuit capacitor 4, then thereafter all the energy (from induced X) in the receive coil is discharged (both i and v=0). However, in reality, switching a solid-state switch such as switches 3 and 9 produce charge injection into the LCR analogue circuit. This can be compensated for by either switching switch 9 from node 6 to the system ground 1, and switching switch 3 from open to the system ground 1, slightly before, or slightly after the termination of the period of rapidly changing transmit magnetic field, depending on the effect of the magnitude and sign of the said charge injection, so as to compensate for the charge injection. The said switching slightly before will cause i to be slightly negative at the termination of the period of rapidly changing transmit magnetic field, whereas switching slightly after will cause i to be slightly positive, at the termination of the period of rapidly changing transmit magnetic field. This method thus removes almost all the energy in the receive coil following the period of rapidly changing transmit magnetic field.

In a second embodiment, switch 3 is not employed. The aim of the second embodiment is to remove the $\omega t e^{-\omega t}$ term but retain $e^{-\omega t}$. The damping resistor is switched to a voltage source during most of the period of rapidly changing transmit magnetic field, and in this case the said damping resistor is split between resistor 8 and resistor 5, with resistor 5 being switched to capacitor 17 (with X volts across it), and resistor 8 being switched to the output of the buffer amplifier 15. Thus the effective damping resistor's value is R in parallel with R1, and this effective damping resistor is connected to u (volts) of effective value, a first voltage, $$u = \frac{X(R1 + GR)}{R1 + R}.$$

Shortly before the end of the period of rapidly changing transmit magnetic field at a first time/first time period "t=−d", wherein the abrupt termination of the period of rapidly changing transmit magnetic field is at time t=0, the effective damping resistor is switched to the system ground 1, via both switches 9 and 14 being controlled to select the system ground 1.

Figure 2:
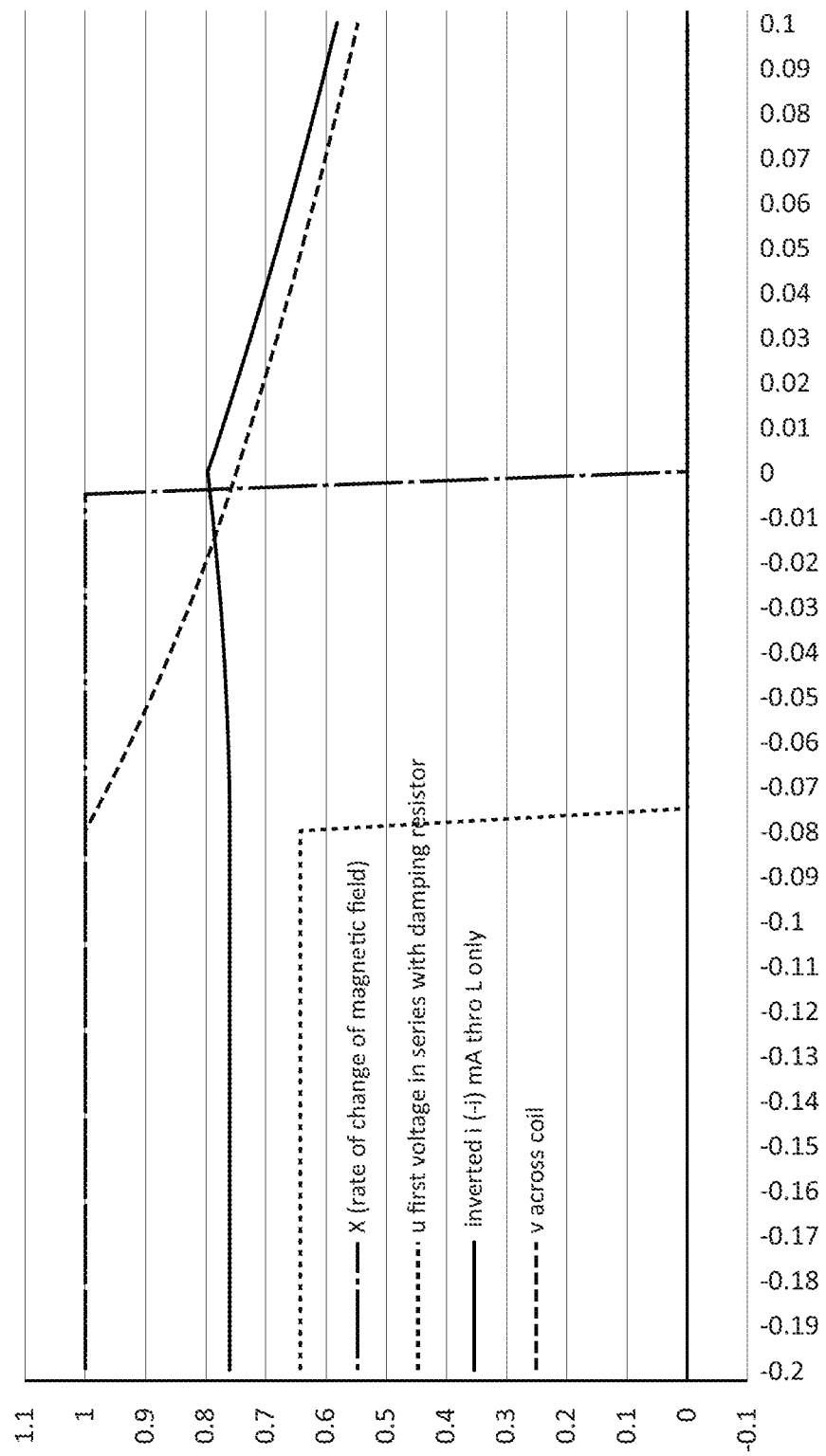
FIG. 2 depicts parameters set to cancel the $\omega t e^{-\omega t}$ term.

FIG. 2 shows the signals for this situation with parameters set to cancel the $\omega t e^{-\omega t}$ term:

a) Just before a first time t<−0.08 µs (=d), the voltage v across the coil (node 7)=X=1, and the current i at 18 flowing through inductor 2 is $$i = \frac{u - X}{R \| R1};$$

b) During the first time period, between $-0.08\ \mu s < t < 0\ \mu s$:

$$v = -2u\omega t' e^{-\omega t'} + X, \quad i = \frac{u}{R_{eff}}(1 + \omega t')e^{-\omega t'} - \frac{X}{R_{eff}}$$

where $t' = 0$ begins at $t = -0.08\ \mu s$ and $R_{eff} = \frac{R1R}{R1+R}$;

and c) After the first time period, $t => 0\ \mu s$, the condition for the removal of the $\omega t e^{-\omega t}$ term is that $u = 0.5Xe^{\omega d}$, and when this condition is chosen, $$v = X[1 - \omega d]e^{-\omega t}, \quad i = -\frac{X}{2R}(1 - \omega d)]e^{-\omega t},$$

and hence $$\frac{v}{i} = -2R$$

when $t=0$ (for the current convention indicated in FIG. 1).

For the example shown in FIG. 2, $u=0.6429X$, $d=0.08\ \mu s$. Alternatively, if $u=X$, then $$d = \frac{\ln(2)}{\omega} = 0.22\ \mu s,$$

or, if $d=0$, then $u=X/2$, for example the latter when R=R1=double the value of the critical damping resistor and G=0.

Figure 3:
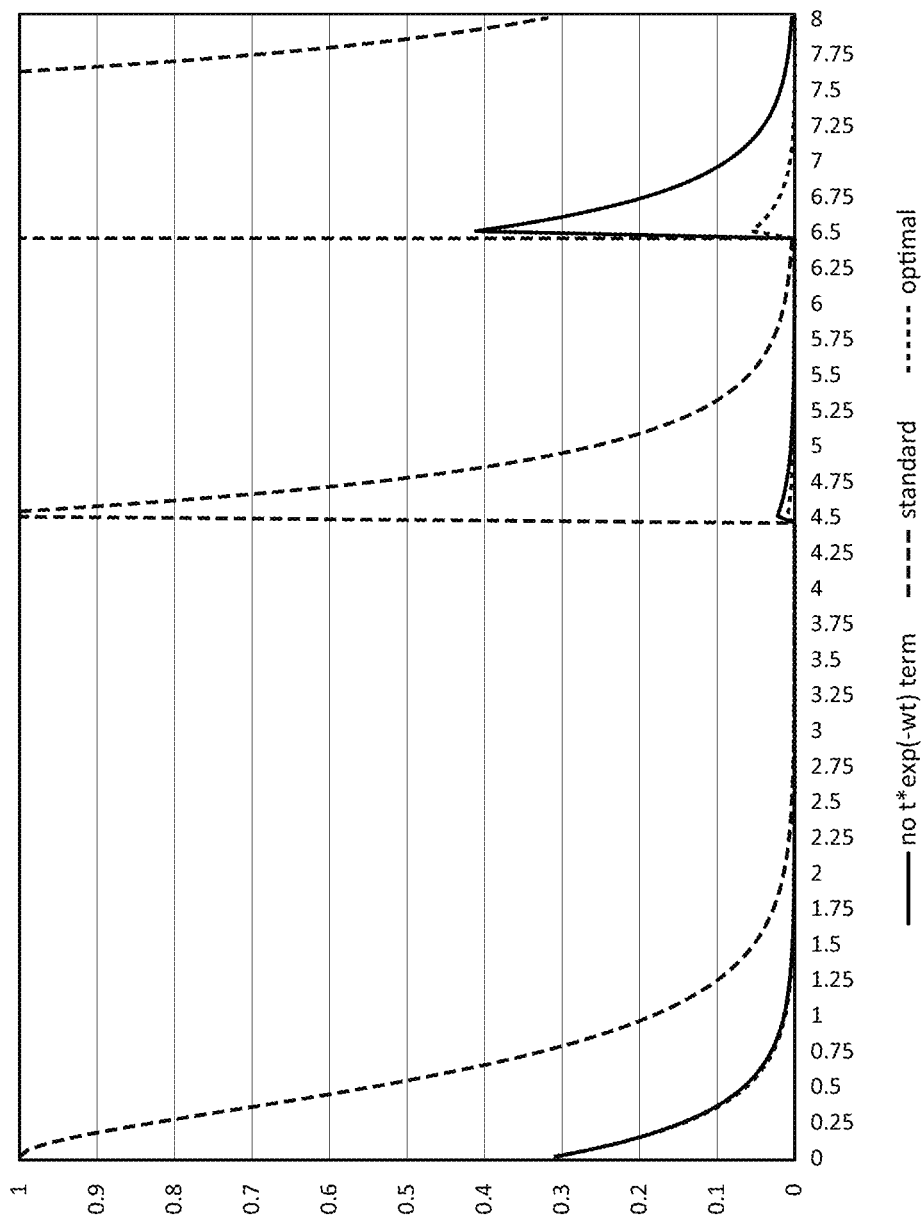
FIG. 3 shows the standard critically damped receive response following a transmit coil reactive voltage step as a long dashed curve, while the solid curve is for $\omega t e^{-\omega t}$ nulled out.

FIG. 3 shows the standard critically damped receive response following a transmit coil reactive voltage step as a long dashed curve, while the solid curve is for $\omega t e^{-\omega t}$ nulled out, when $u=X=1$, $\omega d=\ln(2)=0.693$. Until 4.5 μs, the graphs are multiplied by 1, between 4.5 μs and 6.5 μs by 100,000, and after 6.5 μs by $10^9$ for which the standard critical damping response is mostly off scale. The dotted curve is for an "optimal" setting for which there is a very tiny fraction $\omega t e^{-\omega t}$ term, but with a negative contribution in order to slightly negate the $e^{-\omega t}$ term at periods longer than several microseconds, and for this condition, for example, $u=X=1$ and $\omega d=0.68$.

A third embodiment shows a method to completely cancel both the voltage and current decays using two different voltage source values. During the period of rapidly changing transmit magnetic field, a voltage u is applied in series with the effective damping resistor as in the second embodiment, until a first time $t=-d$ when a voltage z applied in series with effective damping resistor takes over, and at a second time $t=h$, the effective damping resistor is switched to the system ground 1, which is when both the voltage across the coil and the current through inductor 4 becomes simultaneously 0, which means the energy stored in the coil thereafter is zero, so the decay signal from the signal induced in the receive coil during the period of approximately constant transmitted magnetic field disappears after $t=h$. This also does not employ the shorting switch 3. This is achieved by selection of the resistors 5 and 8, d and h, and G of amplifier 15.

Figure 4:
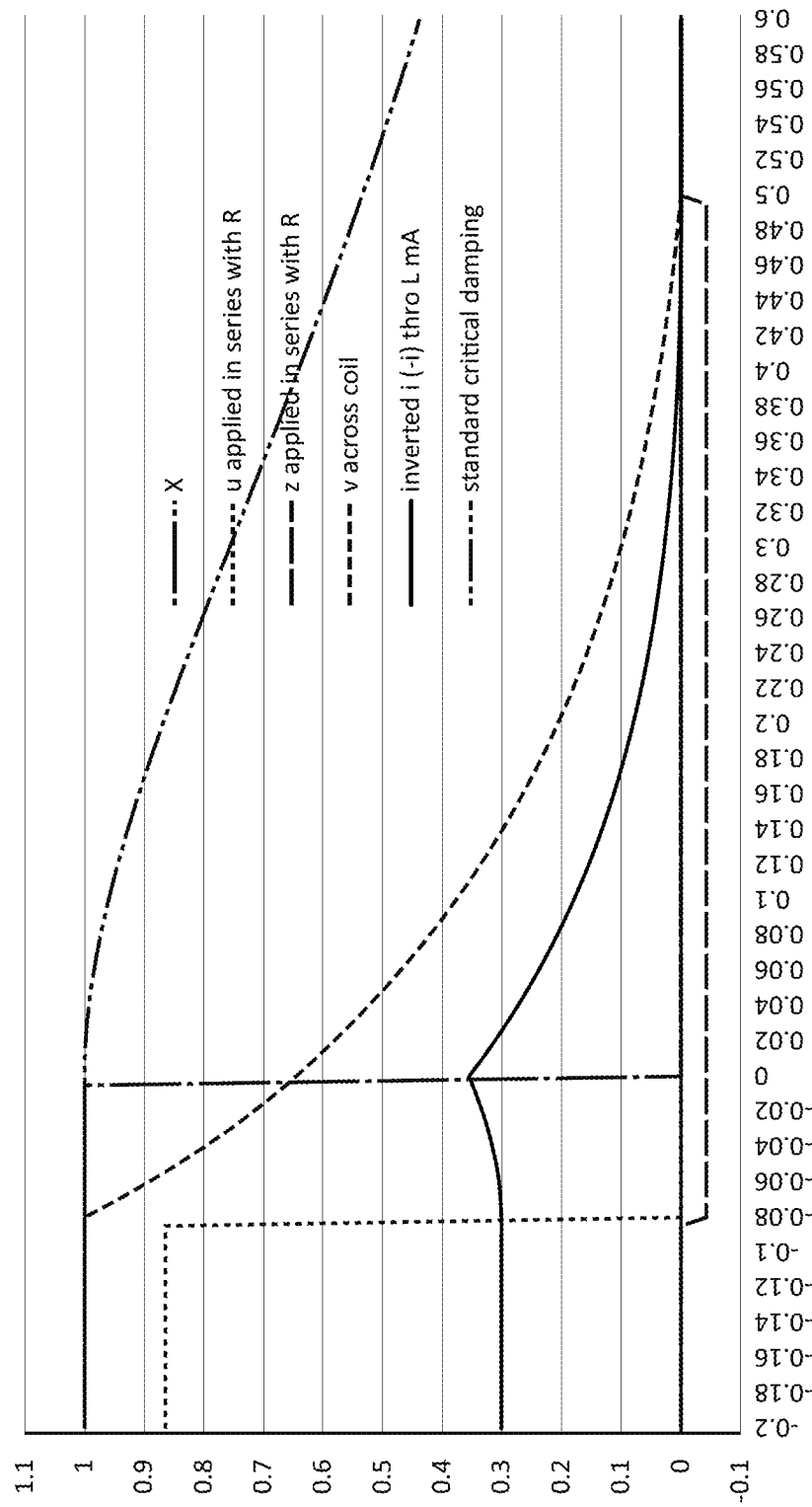
FIG. 4 shows example signal responses for the third embodiment.

FIG. 4 shows example signal responses for the third embodiment. In particular, as can be observed:

a) When $t < -d$, $X=1$, $v=X$, $i=(u-X)/R$;

b) During a first time period, between $-d < t < 0$, $v = 2(z-u)\omega t' e^{-\omega t'} + X$, and $$i = \frac{1}{R_{eff}}[(u-z)(1 + \omega t')e^{-\omega t'} + z - X],$$

where $t' = t+d$; and c) Between $0 < t < h$, $v = \{2(z-u)\omega d e^{-\omega d} + X + [X + 2(z-u)e^{-\omega d}]\omega t\}e^{-\omega t}$ and $$i = \frac{1}{2R_{eff}}\{2z - v - [X + 2(z-u)e^{-\omega d}]e^{-\omega t}\}$$

To make both the voltage across the receive coil at node 7, and the current flowing through inductor 2=0 at the second time when $t=h$, select values (d, h, u, z) so that $$z = \frac{2\omega(d+h)ue^{-\omega d} - X(1 + \omega h)}{2\omega(d+h)e^{-\omega d}} \text{ and}$$

$$u = \frac{\{X(1 + \omega h/2) + z[1 + \omega(d+h)]e^{-\omega d}\}e^{-\omega h} - z}{[1 + \omega(d+h)]e^{-\omega(d+h)}}$$

and as no external voltage X is induced in the Rx coil for $t > h$ (h>0), no energy is left in the coil to cause a decay (ignoring the sources such as VRM, EMI, rate of change of static magnetic fields as already stated). The example FIG. 4 of this third embodiment has $d=0.08\ \mu s$, $h=0.5\ \mu s$, $u=0.8643X$, $z=-0.04271X$ selected.

Alternatively, the signal at the output 42 of preamplifier 41 can be measured immediately or shortly after $t=h$, and this is fed to an input of a negative feedback loop within the timing and processing electronics 43 and metal detector timing generator 10 to control z (or u, or d) to minimize the residue decay signal after $t=h$. Further, similarly, this feedback loop may be applied to the first or second or third embodiment.

A fourth embodiment, similar to the third embodiment, sets both voltage across the receive inductor 2 and the current flowing though inductor 2=0 at $t=h$, but uses a momentary short circuit from switch 3 to force v to 0 at $t=h$ (by discharging the capacitor 4) when the current through inductor 4 reaches 0.

Figure 5:
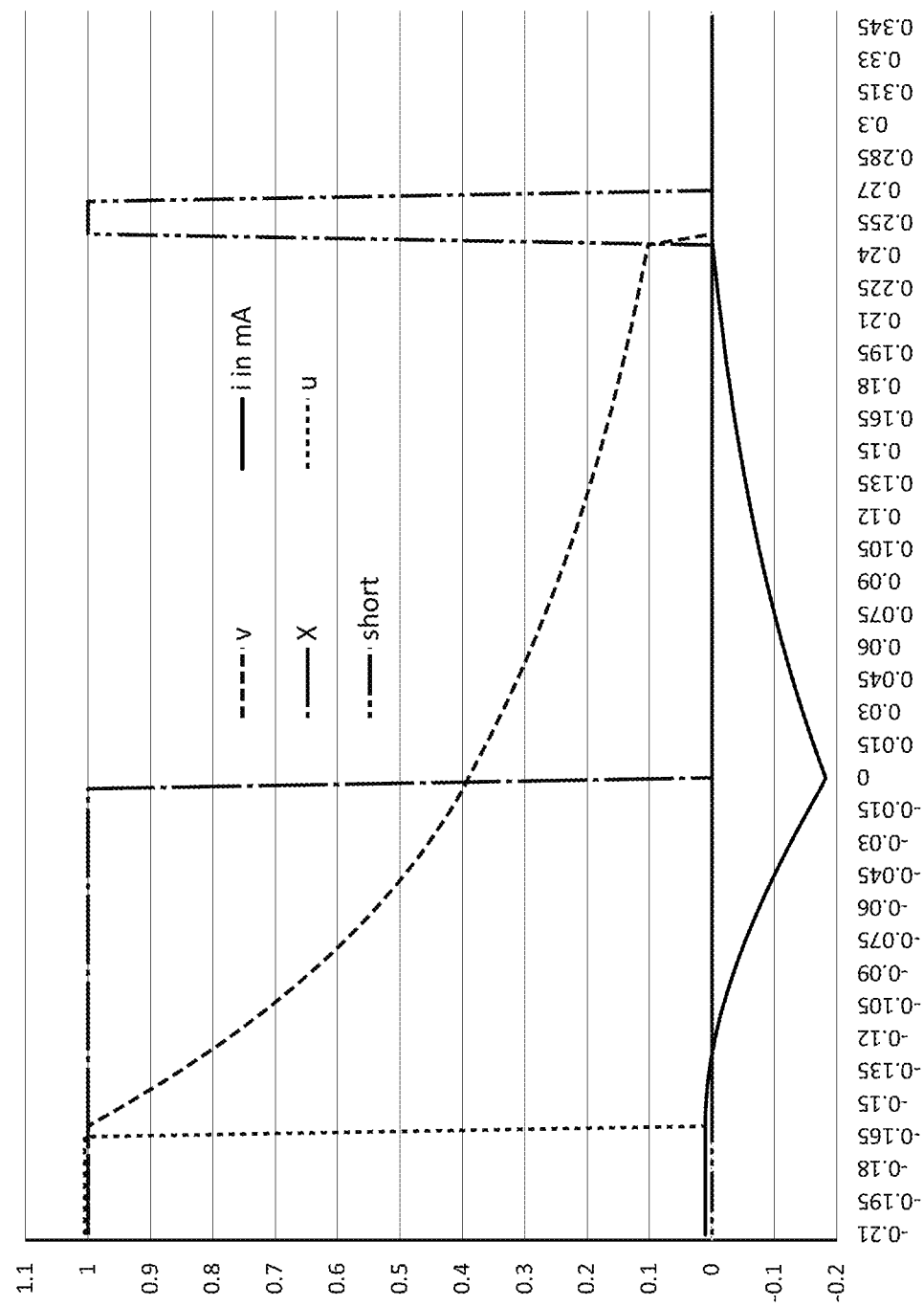
FIG. 5 shows example waveforms for the fourth embodiment.

FIG. 5 shows example waveforms for the fourth embodiment. For this example, $u=1.005X$, $d=160$ ns, the Rx coil is short circuited at $t=h=250$ ns just as i reaches 0. The following are calculated:

a) At time $<-160$ ns: v across the coil=X=1, the current i flowing through inductor 2 at node 18 is $$i = \frac{u - x}{R_{eff}};$$

b) Between $-d = -160$ ns $< t0\ \mu s$:

$$v = -2u\omega t' e^{-\omega t'} + X, \quad i = \frac{u}{R_{eff}}(1 + \omega t')e^{-\omega t'} - \frac{X}{R}$$

where the variable "t" in this equation commences when t=−0.160 μs;

c) After t>0 μs, if u=0.5Xe$^{\omega d}$, v=[X−2uωde$^{-\omega d}$+(X−2ue$^{-\omega d}$)ωt]e$^{-\omega t}$ and $$i = \frac{1}{R_{\text{eff}}}\left[u(1+\omega d)e^{-\omega d} - X + \left(ue^{-\omega d} - \frac{X}{2}\right)\omega t\right]e^{-\omega t} \text{ and}$$

$$\text{if at } t = h, u = \frac{X(1+0.5\omega h)}{[1+\omega(d+h)]e^{-\omega d}}$$

then i=0 so the magnetic field energy in the coil is zero at t=h, at which time the coil is shorted out to remove the voltage (v) across the capacitance 4, leaving no energy left in the coil to decay, the second time h in the FIG. 5 being shown at h=0.25 μs.

Alternatively, this becomes the first embodiment, if u=X and d=h=0, and immediately after t=0, switch 3 momentarily shorted out capacitor 4 (so v=0). However, the fact that all semiconductor switches have real resistances and part of energy stored in capacitance 5 is distributed within the inductive windings of the Rx coil 2, means that the short circuit is not in fact literally a short circuit, and thus the back-emf transient "decay" is thus not completely absent under these conditions. Thus, it is better to measure the signal at the output 42 of preamplifier 41 immediately or shortly after the brief period of short circuit, and feed this to an input of a negative feedback loop within the timing and processing electronics 43 to control u (or d) to minimize the residue decay signal after the brief period of the short circuit.

In a fifth embodiment, because the back-emf period >> 1/ω, when t=0 with the standard configuration of a "passive LCR" coil receiver, the relationship between v and i is known during the period of rapidly changing transmit magnetic field and therefore at t=0, namely, v=X, i=−X/R$_{\text{eff}}$. This embodiment does not employ switch 9, nor resistor 5 or the buffer amplifier 15.

If at a first time at t=0, the damping resistor 8 is open circuited (via switch 14), or floated, then the coil will be underdamped and ring. For this open circuit condition, at $$t = \frac{\arctan\left(\frac{1}{3}\right)}{\omega}, \frac{v}{i} = -2R,$$

and this is the condition to cancel the ωte$^{-\omega t}$ term, and if resistor 8 is then switched back to the system ground 1, the decaying signal only has the e$^{-\omega t}$ term. For the values of ω used in these examples (10⁶π radians per second), then the period for which resistor 8 is floating is between t=0 and t=0.1 μs, in order to remove the ωte$^{-\omega t}$ term. Similarly, the resistor may be switched out of the circuit for an appropriate period a little before or after t=0. For example, as per the second embodiment, if the resistor is switched open circuit at a first time t=−d, then at t=0, v=X(2 sin ωd+1), $$i = -\frac{X}{R_{\text{eff}}}\cos\omega d,$$

and hence for $$\frac{v}{i} = -2R_{\text{eff}},$$

2 sin ωd+1=2 cos ωd, for which if at t=0 (or t=2nπ/ω) the effective damping resistor is again switched to the system ground 1, then the ωte$^{-\omega t}$ term is absent. In the example resonant frequency given here, d=0.135 μs. But if d<0.135 μs, then at $$t = \frac{1}{\omega}\tan^{-1}\left\{\left[2\cos\omega d - \frac{1}{R\omega C}\sin\omega d\right]\middle/\left[2\cos\omega d + 2\sin\omega d\right]\right\},$$

the effective damping resistor is again switched into the circuit to the system ground 1, then the ωte$^{-\omega t}$ term is absent. For example, the dampening resistor 8 may be switched to open circuit between t=−0.08 and t=h=0.04 μs. The following is calculated:

a) Between t=−0.08 μs (d=0.08 μs) and t=0 μs, =X[1+2 sin ω(t+0.08)], $$i = -\frac{X}{R}\cos\omega(t+0.08);$$

b) Between t=0 and t=h=0.04 μs:

$$v = X[2\sin\omega t + (1+2\sin wd)\cos wt],$$

$$i = \frac{X}{R}\left[\left(\sin\omega d + \frac{1}{2}\right)\sin\omega t - \cos\omega d\cos\omega t\right].$$

Thereafter normal critical damping is resumed and the ωte$^{-\omega t}$ term is absent.

Figure 6:
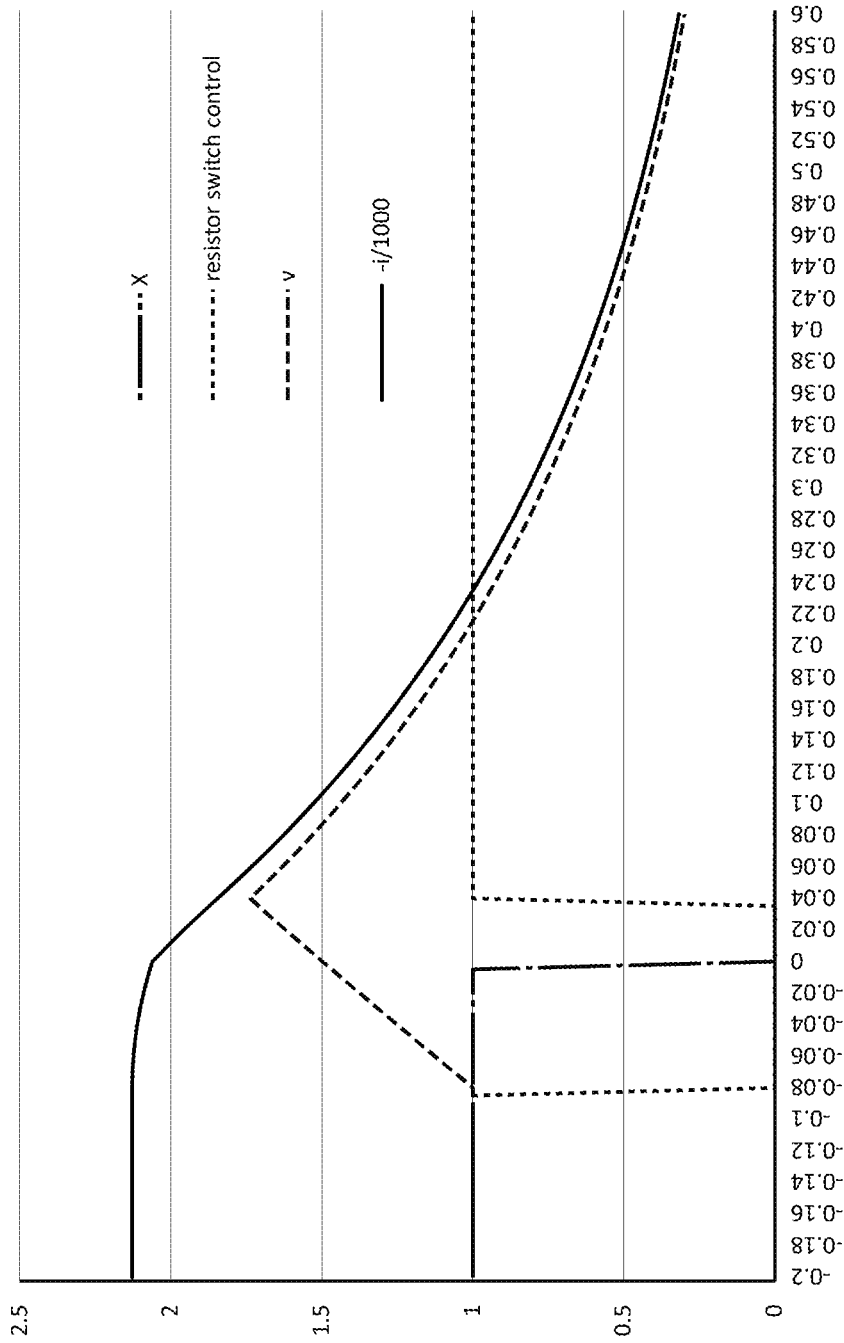
FIG. 6 shows waveforms when the damping resistor is open circuit for a brief period to eliminate $\omega t e^{-\omega t}$ term.
Figure 7:
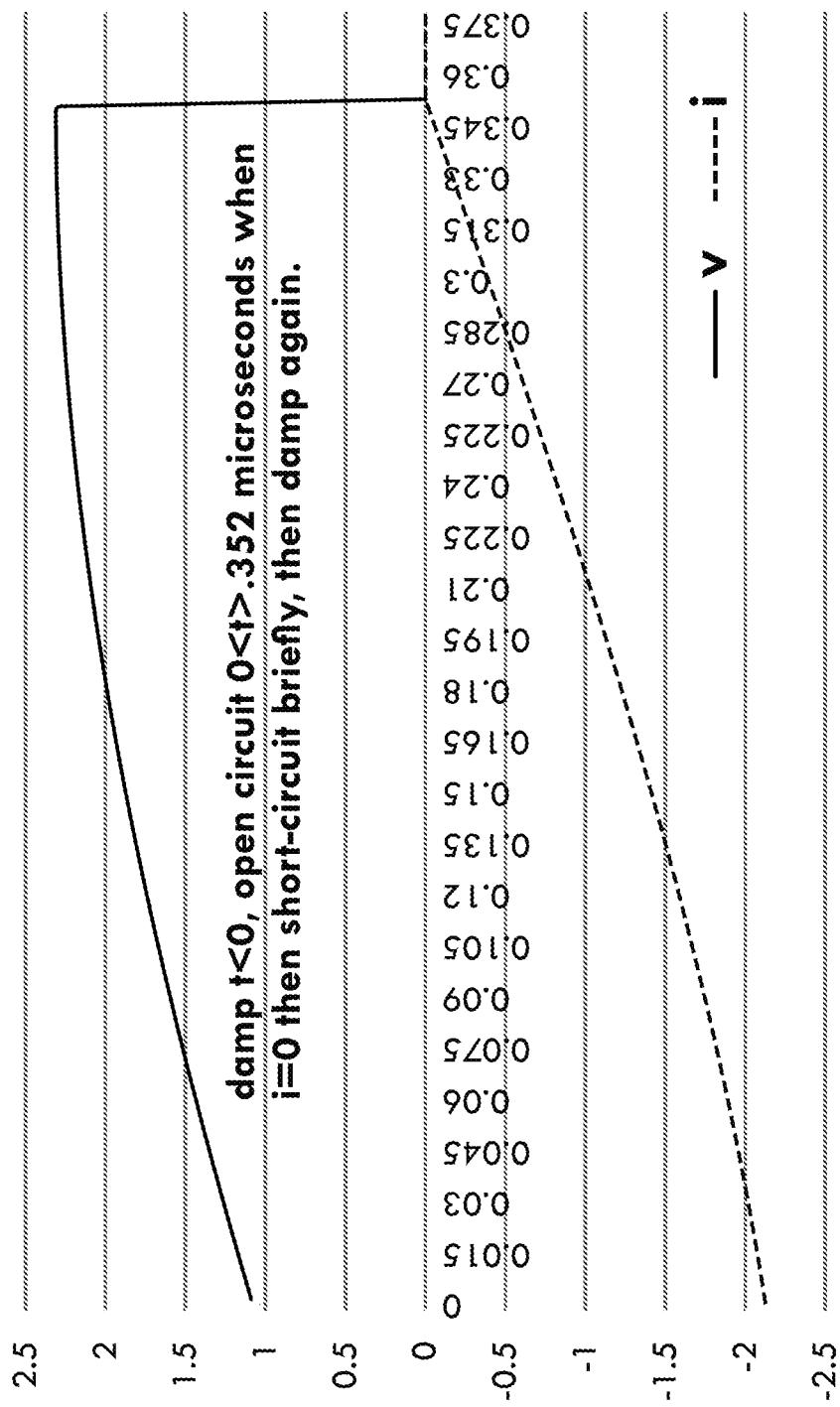
FIG. 7 shows waveforms when the Rx coil is shorted out to eliminate the stored charge in the Rx coil capacitance following a brief period of no damping applied to the coil.

Alternatively, the damping resistor may be open circuited for a brief period, then when the current i reaches 0, the Rx coil is shorted out to eliminate the stored charge in the Rx coil capacitance. This is shown in FIG. 6. When the dotted line is 1, damping resistor 8 is switched to the system ground 1, when the dotted line is 0, resistor 8 is open circuited.

The examples of a sixth embodiment consist of having periods of altered critical damping to under or over damping, but not short circuit nor open circuit, and wherein at least part of either periods of critical and/or under and/or over damping may have the parallel effective resistor connected momentarily to a voltage source of a first voltage of value u proportional to received X during the period of rapidly changing transmit magnetic field.

Figure 8:
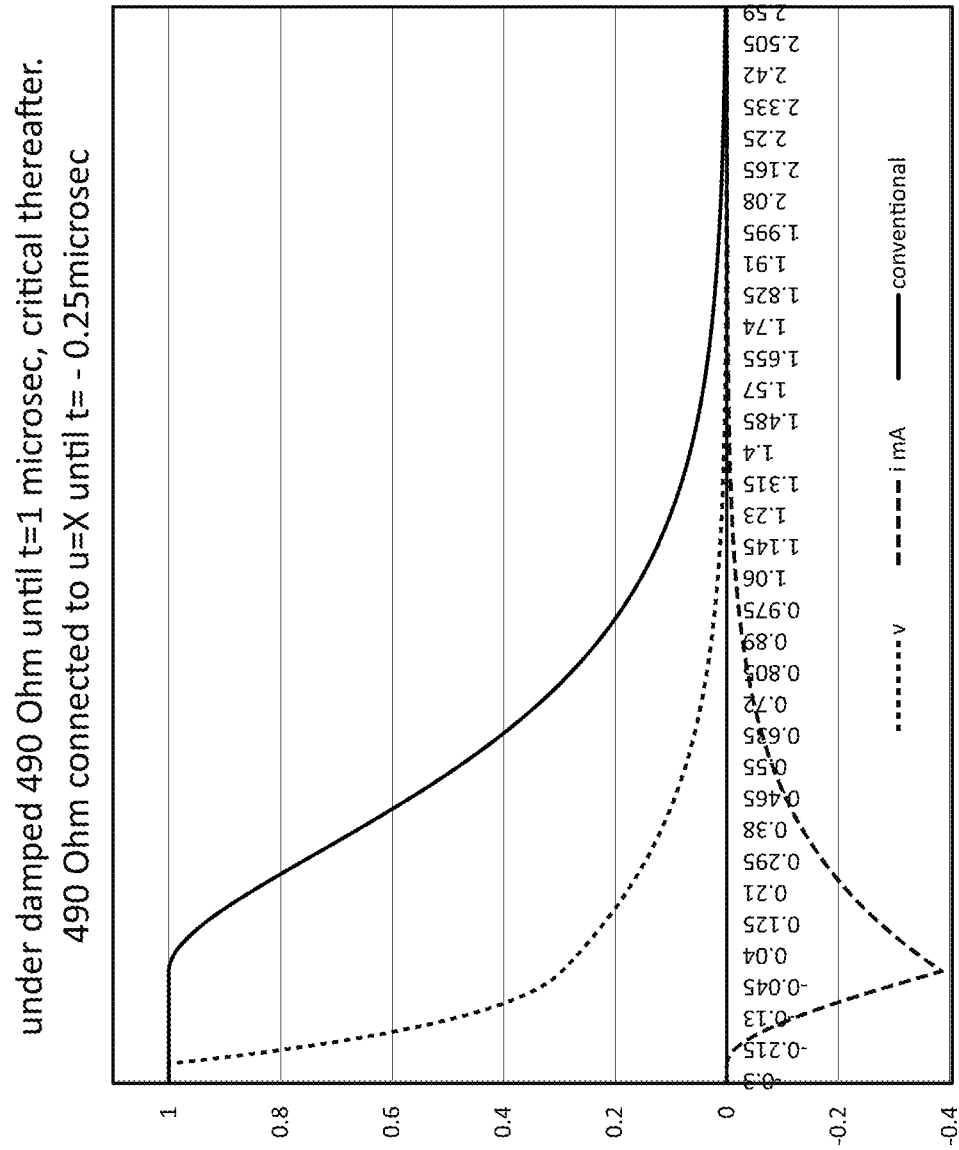
FIG. 8 shows a set of exemplary waveforms when the damping resistor is temporarily altered to being above that required for critical damping.

As shown in FIG. 8, in relation to a period of underdamping: until t=d=−0.25 μs, the effective damping resistor is either of value p=490Ω or critical damped (470 Ohms), and for −0.25 μs<t<1 μs, the resistor is switched to underdamp at 490Ω and switched to the system ground 1, and for t>1 μs, switched back to critical damping with 471.24Ω (470Ω). The effective damping resistor (490 or 470Ω) is connected in series with u=X=1 during the period of rapidly changing transmit magnetic field until t=−0.25 μs (e.g. resistor 5=490ω and resistor 8=11.5 kΩ, and switch 14 is switch open until t=1 μs, when it then switches to the system ground 1, and switch 9 selects node 6 until t=−0.16 μs, and thereafter the system ground 1). The following is calculated:

a) For −0.25 μs<t<0; when p=490 and no longer switched to be in series with u=X=1, $$v = -\frac{X}{pmc}e^{-\frac{t'}{2pc}}\sin(mt') + X, i = \frac{X}{p}\left\{\left[\cos(mt') + \frac{\sin(mt)}{2pmc}\right]e^{-\frac{t'}{2pc}} - 1\right\}$$

-continued $$\text{where } m = \sqrt{\omega^2 - \left(\frac{1}{2pc}\right)^2}$$

where t' commences at t=−0.25 μs;
b) When t=0, $v_0$, the initial voltage across the coil, and $i_0$, the initial current i through the modelled inductor 2, are for the above equations at t'=d=0.25 μs;
c) For 0<t<1 μs, $$v = \left[v_0 \cos(mt) - \frac{1}{mc}\left(\frac{v_0}{2p} + i_0\right)\sin(mt)\right]e^{-\frac{t}{2pc}},$$

$$i = \left\{i_0 \cos(mt) + \left[\frac{1}{2pmc}\left(\frac{v}{2p} + i_0\right) + v_0 mc\right]\sin(mt)\right\}e^{-\frac{t}{2pc}}.$$

d) For t>1 μs, conventional damping is resumed with the initial v(1 μs) and i(1 μs) values of the above equations. As can be seen from FIG. 8, the value of both v and i are near zero at about 1.6 μs compared to the conventional decay critical damping.

Figure 9:
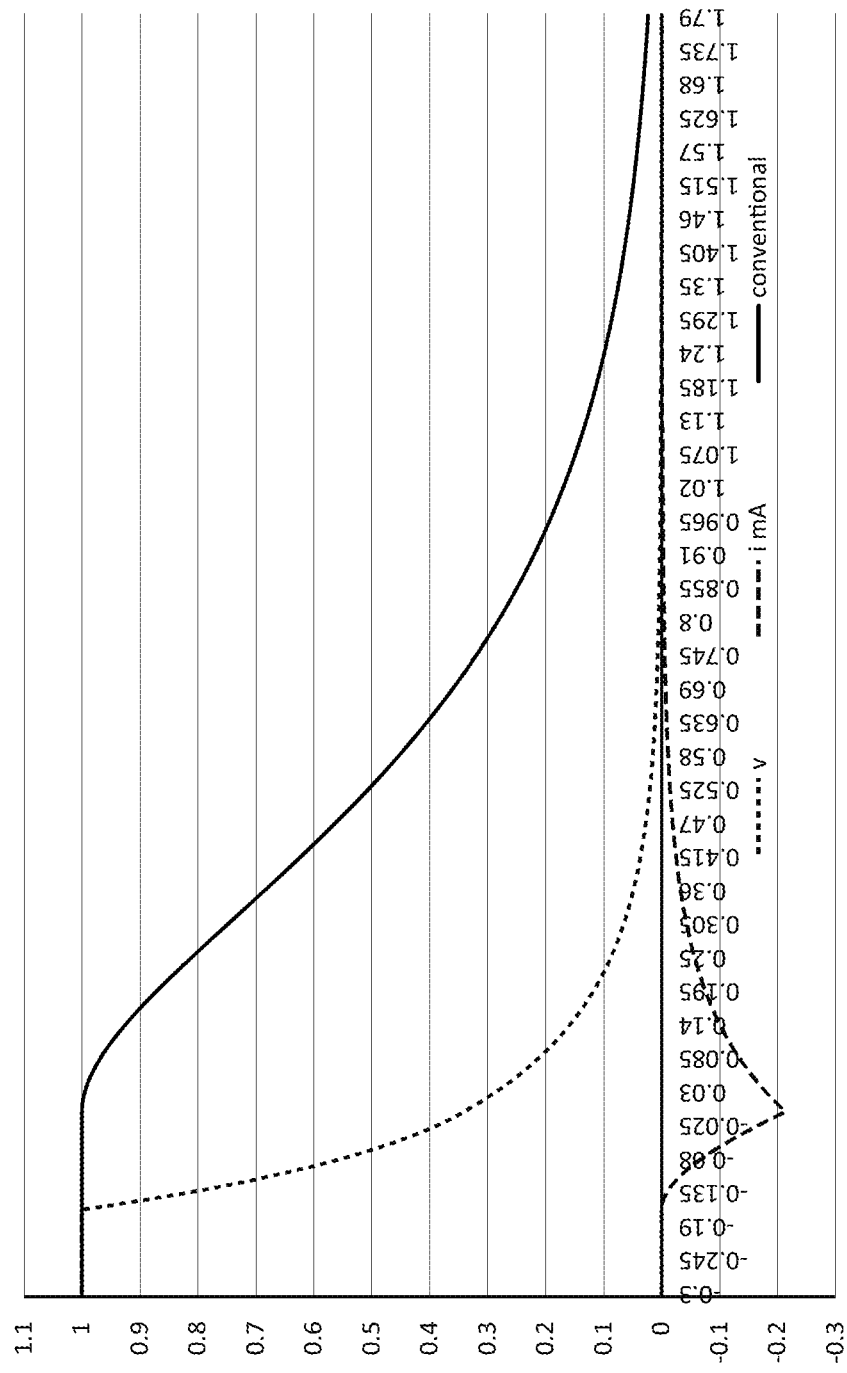
FIG. 9 shows another set of exemplary waveforms when the damping resistor is temporarily altered to being below that required for critical damping.

As shown in FIG. 9, in relation to a period of overdamping: Until t=−0.16 μs, the effective damping resistor is either of value p=408Ω or critical damped (470Ω) with u=1, and for −0.16 μs<t<1 μs, the effective damping resistor is switched to overdamp at 408Ω with this resistor switched to the system ground 1, and t>1 μs, switched back to conventional critical damping with R=471.24Ω. The effective damping resistor is connected in series with u=X=1 during the period of rapidly changing transmit magnetic field until t=−0.16 μs. For example, resistor 5=470Ω and resistor 8=3.09 kΩ, and switch 14 is switched to open until t=−0.16 μs, when it then switches to the system ground 1, and after t=1 μs, returns to open circuit, and, switch 9 selects node 6 until t=−0.16 μs, and thereafter the system ground 1.

For these conditions the following is calculated:
a) For −0.16 μs<t<0, when p=408Ω and is no longer switched to be in series with u=X=1, $$v = -\frac{X}{2pmc}e^{-\frac{t'}{2pc}}\left(e^{mt'} - e^{-mt'}\right) + X,$$

$$i = \frac{X}{p}\left\{\left[\left(1 + \frac{1}{2pmc}\right)e^{mt'} + \left(1 - \frac{1}{2pmc}\right)e^{-mt'}\right]e^{-\frac{t'}{2pc}} - 1\right\}$$

$$\text{where } = \sqrt{\left(\frac{1}{2pc}\right)^2 - \omega^2};$$

b) When t=0, $v_0$ and $i_0$ are for the above equations with t'=d=0.16 μs;
c) For 0<t<1 μs, $$v = \frac{e^{-\frac{t}{2pc}}}{2mc}\left\{\left[v_0\left(mc - \frac{1}{2p}\right) - i_0\right]e^{mt} + \left[v_0\left(mc + \frac{1}{2p}\right) + i_0\right]\right\}e^{-mt}$$

$$i = \left\{-\frac{1}{2}\left[1 + \frac{1}{2pmc}\right]\left[v_0\left(mc - \frac{1}{2p}\right) - i_0\right]e^{mt} + \right.$$

$$\left.\frac{1}{2}\left[1 - \frac{1}{2pmc}\right]\left[v_0\left(mc + \frac{1}{2p}\right) + i_0\right]e^{-mt}\right\}e^{-\frac{t}{2pc}};$$

d) For t>1 μs, conventional damping is resumed with the initial v(1 μs) and i(1 μs) values of the above equations.

Again as can be seen, the value of both v and i are near zero at about 1 μs compared to the conventional decay critical damping.

This sixth embodiment is different from a mono-loop having a T/R switch active to facilitate rapid decay. A mono-loop having a T/R switch active for rapid decay essentially uses a T/R switch as an active element in that rapid decay, whereas conventional PI T/R switches are only switched on when the back-emf has died down to about a volt or so. In contrast, the sixth embodiment herein could be used with a nulled coil or a mono-loop with a conventional T/R switch with altered values of damping resistor switched in and out during the back-emf decay. Thus, this does not employ the T/R switch to actively decrease the transmit coil back-emf decay period in a mono-loop coil.

A seventh embodiment includes various combinations of the other embodiments, including for example, non-linear damping. This may also include constant current sources that may change value for different periods, or changing value of resistors by switching in different valued resistors across the receive coil (some possibly causing underdamped or others possibly causing over-damped conditions for various periods), to either null out the $\omega t e^{-\omega t}$ term, or reduce both v and i to zero simultaneously. Different negative feedback loops may be usefully employed similar to those described in the other embodiments.

Note that any of the mathematics may be altered to take account of the finite length of period of rapidly changing transmit magnetic field.

Immediately following the period of rapidly changing transmit magnetic field, usually a significant VRM signal is present from magnetic soils, and quite often a signal from soil saline components too. It is well-known that these can be measured. These are also present during the period of rapidly changing transmit magnetic field when X is measured and this may cause inaccuracies in measuring X, but this may be rectified. Further, if the said feedback loops are employed, the VRM and/or saline signals may interfere with the measurements of the input signals to the negative feedback loops that are only intended to reduce or eliminate the receive coil "X-decay" following a period of rapidly changing transmit magnetic field. Hence, a proportion of both the measured receive VRM and saline components may be subtracted from the input signals to negative feedback loop in order to remove their effects in reducing (or minimizing) the transient decaying "X" signals from the period of rapidly changing transmit magnetic field in the receive coil.

Figure 10:
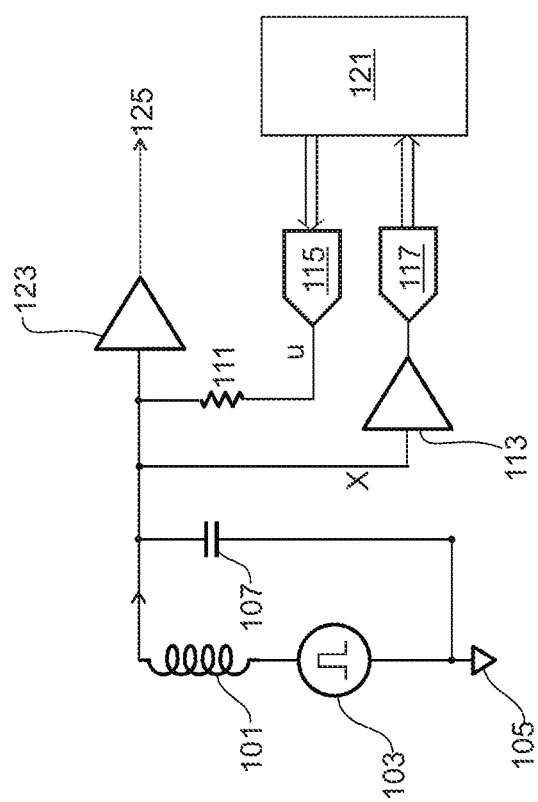
FIG. 10 depicts an alternative embodiment where the switches in FIG. 1 are not required.

FIG. 10 depicts an alternative block diagram where the switches 9, 14 in FIG. 1 are not required. This embodiment can replicate other embodiments described herein where the switches 9, 14 are required. To replicate these other embodiments, there is provided a receive coil 101, a switched source 103 modelling the received induced voltage signal during a PI-like transmit period of rapidly changing transmit magnetic field, system ground 105, capacitor 107, buffer 113, DAC 115, ADC 117, processor 121, damping resistor 111, preamplifier 123, and output 125. The ADC 117 samples the voltage "X" both during the period of rapidly changing transmit magnetic field and the period of time following the period of rapidly changing transmit magnetic field, as required. The signal from the ADC is processed by the processor 121 and applied to the DAC 115 to generate the output voltage "u". This voltage takes values related to "X" or "0" (ground) starting at various moments in time such as "−d" or "h" or any other time. This way, the alternative block diagram fulfills the mathematical equations of the previous embodiments, which it attempts to replicate. In one form, the damping resistor 111 is implemented through a digital potentiometer controlled by the processor 121. In such a case, one end of the digital potentiometer is connected to one end of the receive coil 101 and the other end of the digital potentiometer and the wiper of the digital potentiometer are connected to DAC 115. This way, the value of the damping resistor 111 may be controlled by the processor 121, for example to under damp, critically damp or over damp the circuit.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The system may be a computer implemented system comprising of a display device, a processor and a memory and an input device. The memory may comprise instructions to cause the processor to execute a method described herein. The processor memory and display device may be included in a standard computing device, such as a desktop computer, a portable computing device such as a laptop computer or tablet, or they may be included in a customised device or system. The computing device may be a unitary computing or programmable device, or a distributed device comprising several components operatively (or functionally) connected via wired or wireless connections. An embodiment of a computing device comprises a central processing unit (CPU), a memory, a display apparatus, and may include an input device such as keyboard, mouse, etc. The CPU comprises an Input/Output Interface, an Arithmetic and Logic Unit (ALU) and a Control Unit and Program Counter element which is in communication with input and output devices (e.g. input device and display apparatus) through the Input/Output Interface. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc.). A graphical processing unit (GPU) may also be included. The display apparatus may comprise a flat screen display (e.g. LCD, LED, plasma, touch screen, etc.), a projector, CRT, etc. The computing device may comprise a single CPU (core) or multiple CPU's (multiple core), or multiple processors. The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules or instructions. The processor(s) may be configured to load and executed the software modules or instructions stored in the memory.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the invention.

The invention claimed is:

1. A metal detector, including:
   a transmitter for transmitting a repeating sequence of transmit magnetic field, each of the sequence includes a period of changing or constant non-zero transmit magnetic field, immediately followed by period of rapid change of transmit magnetic field, immediately followed by a period of substantially constant or zero transmit magnetic field;
   a receive coil which is a separate coil from the transmitter; and
   a damping resistor;
   wherein the damping resistor and a circuit with a variable parameter form a series connection, and one end of the series connection is connected to an end of the receive coil, and the damping resistor is connected to the circuit with a variable parameter at a node away from an input to receive electronics of the metal detector;
   wherein a signal is induced in the receive coil during the period of rapid change of transmit magnetic field, and the signal induced in the receive coil decays at least at a termination of the period of rapid change of transmit magnetic field; and
   wherein the variable parameter is controlled, at a selected time, to change from a parameter value to a different parameter value when the signal induced in the receive coil is decaying, or during the period of rapid change of transmit magnetic field, such that the rate of change of the decay is more rapid than when such control of the variable parameter is absent.

2. The metal detector according to claim 1, wherein the change of the variable parameter is effected by a switch, wherein the switch is controlled to switch the other end of the damping resistor from a circuitry element to another when the signal induced in the receive coil is decaying, or during the period of rapid change of transmit magnetic field, such that the rate of change of the decay is more rapid than when such control of the switch is absent.

3. The metal detector according to claim 1, wherein the change of the variable parameter is effected by a DAC, wherein the DAC is controlled to change an output of the DAC from one value to another when the signal induced in the receive coil is decaying, or during the period of rapid change of transmit magnetic field, such that the rate of change of the decay is more rapid than when such control of the DAC is absent.

4. The metal detector according to claim 3, wherein the control of the DAC is based on a signal from the receive coil.

5. The metal detector according to claim 2, further including a voltage source, wherein the voltage source is connected to an end of the damping resistor opposite to the end connected to an end of the receive coil, wherein the voltage source is controlled to reduce or eliminate an induced energy across the receive coil during the period of substantially constant or zero transmit magnetic field, the induced energy caused by a detection of the transmit magnetic field by the receive coil during the period of rapid change of transmit magnetic field; the control of the voltage source includes:
  a) changing a voltage value of the voltage source from a first voltage to a fixed voltage at a first time or during a first time period within the period of rapid change of transmit magnetic field, the first voltage is dependent on the induced energy during at least a duration of the period of rapid change of transmit magnetic field; and
  b) the first voltage and fixed voltage and first time or first time period are selected to increase the rate of change of the decay.

6. The metal detector according to claim 5, wherein an effective parallel inductance of the receive coil inductance of value L, and an effective net parallel capacitance of the receive coil of value C, forms a parallel network consisting of L, C and a parallel damping resistor of value R resistance, such that the parallel network is a substantially critically damped network, and the values of the first voltage and fixed voltage, and values of the first time or first time period are selected such that at least part of a receive signal in the receive coil in a form $$\frac{t}{\sqrt{LC}} e^{-t/\sqrt{LC}}$$

is substantially cancelled, following a commencement of the period of substantially constant or zero transmit magnetic field or first time or first time period, whichever occurs later within the repeating sequence.

7. The metal detector according to claim 6, wherein the first voltage and the first time or first time period are selected so that an initial voltage across the receive coil divided by an initial current flowing through the effective parallel inductance of the receive coil is approximately −2R at the termination of the changing transmit magnetic field when the period of substantially constant or zero transmit magnetic field commences.

8. The metal detector according to claim 5, wherein the voltage source changes from the first voltage to a second voltage at the first time or during the first time period relative to the commencement of the period of substantially constant or zero transmit magnetic field; and
  wherein the voltage source changes from the second voltage to the fixed voltage at a second time or during a second time period relative to the commencement of the period of substantially constant or zero transmit magnetic field, the second time or second time period being after the first time or first time period, and wherein the second time or at least part of the second time period occurs during at least part of the period of substantially constant or zero transmit magnetic field, such that at least part of either or both the first voltage and the second voltage are controlled by a signal induced in the receive coil during at least part of the period of rapid change of transmit magnetic field.

9. The metal detector according to claim 8, wherein only one of the first voltage and the second voltage are controlled by a signal induced in the receive coil during at least part of the period of rapid change of transmit magnetic field, and whichever of the first voltage or the second voltage not controlled by the signal induced in the receive coil during at least part of the period of rapid change of transmit magnetic field is controlled by a signal induced in the receive coil during at least part of the period of substantially constant or zero transmit magnetic field.

10. The metal detector according to claim 8, wherein the induced energy in the receive coil immediately following the second time or second time period that results from a detection of the transmitted magnetic field induced in the receive coil during the period of rapid change of transmit magnetic field is substantially zero.

11. The metal detector according to claim 8, wherein the second voltage is controlled by a first negative loop with an input signal from the receive coil during at least part of the period of substantially constant or zero transmit magnetic field.

12. The metal detector according to claim 1, wherein at a first time or during a first time period, an impedance lower or higher than the damping resistor is applied across the receive coil and continues to be applied until a third time during the period of substantially constant or zero transmit magnetic field.

13. The metal detector according to claim 12, wherein the first voltage is controlled by a second negative loop with an input signal from the receive coil during at least part of the period of substantially constant or zero transmit magnetic field.

14. The metal detector according to claim 9, wherein part of the voltage source includes a switch for switching at least part of the damping resistor to the first voltage, second voltage or the fixed voltage.

15. The metal detector according to claim 14, wherein part of the voltage source includes a capacitor.

16. The metal detector according to claim 12, wherein the damping resistor includes two resistors, a first resistor and a second resistor, such that a net value of the first resistor and second resistor connected in parallel has a value equal to that required for substantially critical damping of the receive coil or altered resistance away from critical damping during the first period until the third time.

17. The metal detector according to claim 16, wherein the first resistor is connected to the voltage source and the second resistor is connected either to a fixed voltage or ground, or an open circuit, or a second voltage source that may also be controlled by a signal induced in the receive coil during at least part of the of rapid change of transmit magnetic field.

18. The metal detector according to claim 17, wherein the receive coil is effectively shorted for a fourth period during the period of substantially constant or zero transmit magnetic field, or, immediately before the period of the period of rapid change in magnetic field transmitted by a transmit coil.

19. The metal detector according to claim 18, wherein, the receive coil is effectively open circuit for a fifth period.

20. A method for increasing a rate of decay of an induced signal in a receive coil of a metal detector due to a signal induced in a transmit coil of the metal detector, wherein the receive coil is a separate coil from the transmit coil; and wherein the signal is induced in the transmit coil during a period of rapid change of transmit magnetic field when a period of changing transmit magnetic field transitions to a period of substantially constant or zero transmit magnetic field, and wherein the induced signal in the receive coil decays at least at the termination of the period of rapid change of transmit magnetic field, the method including:

forming a series connection with a damping resistor and a circuit with a variable parameter; connecting one end of the receive coil to one end of the series connection; and connecting the damping resistor to the circuit with a variable parameter at a node away from an input to receive electronics of the metal detector; and controlling the variable parameter, at a selected time, to change from one to another different one when the signal induced in the receive coil is decaying, or during the period of rapid change of transmit magnetic field, such that the rate of change of the decay is more rapid than when such control of the variable parameter is absent.

21. A non-transitory computer readable medium including instructions, when executed, to perform the method of claim 20.

\* \* \* \* \*